United States Patent [19]

Weissbrod

[11] Patent Number: 4,472,146
[45] Date of Patent: Sep. 18, 1984

[54] LEARNING SYSTEM

[76] Inventor: Jonas M. Weissbrod, 852 11th St., Newport News, Va. 23607

[21] Appl. No.: 318,866

[22] Filed: Nov. 6, 1981

[51] Int. Cl.³ .............................................. G09B 1/34
[52] U.S. Cl. .................................... 434/365; 434/262
[58] Field of Search ............... 434/365, 156, 167, 170, 434/178, 150, 153, 154, 262

[56] References Cited

U.S. PATENT DOCUMENTS

| | | | |
|---|---|---|---|
| 1,192,829 | 7/1916 | Harriman | 434/153 |
| 3,242,596 | 3/1966 | Smith | 434/349 |
| 3,287,831 | 11/1966 | Holm | 434/153 |
| 3,823,492 | 7/1974 | Allain | 434/170 |
| 4,109,938 | 8/1978 | Mitchell et al. | 434/365 X |

OTHER PUBLICATIONS

*Writing Research Papers* by James D. Lester, ©1976, 1971, Scott, Foresman and Company, Title Page, pp. 42-47.
Encyclopaedia Britannica, Micropaedia 3 pages, vol. II (Title, How to Use, and p. 561); Macropaedia, 4 pages, vol. 3 (Title, pp. 875, 876, 885); Propaedia, 6 pages (Title, How to Use, 9-11 and 220).
PTO Manual of Classification, pp. IV-19; V-1; III-25, dated May 1979.

*Primary Examiner*—William H. Grieb
*Attorney, Agent, or Firm*—Lowe, King, Price & Becker

[57] ABSTRACT

Apparatus for learning information which is classifiable into a plurality of levels of detail comprising a first plurality of information bearing elements each bearing a first code indicium and containing information classified at a first level of detail, a second plurality of information bearing elements, each bearing a second code indicium and containing information classified at a second level of detail, and a third plurality of information bearing elements, each bearing a third code indicium and containing information classified at a third level of detail. Additional pluralities of information bearing elements each bearing a characteristic code indicium and containing information classified at a given level of detail may be provided. Also provided is an apparatus for learning information comprising a plurality of information bearing elements which also bear at least two sequence indicia enabling their ready arrangement according thereto into one of a plurality of desired outline formats which differ from one another.

11 Claims, 1 Drawing Figure

LEARNING SYSTEM

FIELD OF THE INVENTION

The present invention relates to learning apparatus and techniques generally and more particularly to learning systems and techniques associated with an outline-type format.

BACKGROUND OF THE INVENTION

In the modern era, there has been an explosion of information in nearly all fields of endeavor. There has not, however, been a corresponding revolution in apparatus and techniques for teaching, learning, assimilating and organizing information.

Commonly employed techniques in education employ lectures, notes, textbooks, laboratory exercises and audio-visual aids. All of these have severe disadvantages. Textbooks are normally organized according to topics and present, in each chapter or section, a detailed body of knowledge relating to the entire topic. Normally, the amount of specific information contained in a textbook relating to a specific topic is more than can be assimilated in a given reading. The internal organization of the information contained in a given section and relating to a given topic is often far from clear. The use of a standard outline in association with a textbook aids in the organization of the material but does not eliminate the need for the student to classify the textbook material according to the outline or the monotony or dealing with pages of information which are presented in an unclassified manner. A further important difficulty is the inability of the student to define the level of detail which he can effectively assimilate in a given study situation and to limit his efforts to the given level of detail. It follows that after a given study time, the student will have mastered some topics in great depth and other topics not at all.

Lectures, notes and laboratory exercises are normally directed at particular points of interest or difficulty and do not give an overview of the entire body of information to be mastered, so as to put these points in perspective.

Audio-visual aids have been developed in recent years, typically in combination with microfilm or computer displays and terminals for enabling individualized learning. While these do represent a significant advance in the organization of information and the completeness of presentation, they suffer from the disadvantage that their use is limited to suitable facilities which are not always available to a student at all locations at which study may take place.

SUMMARY OF THE INVENTION

The present invention seeks to provide learning apparatus which overcomes the disadvantages of the prior art learning apparatus and techniques discussed hereinabove. There is thus provided in accordance with an embodiment of the present invention apparatus for learning information which is classifiable into a plurality of levels of detail comprising a first plurality of information bearing elements each bearing a first code indicium and containing information classified at a first level of detail, a second plurality of information bearing elements, each bearing a second code indicium and containing information classified at a second level of detail, and a third plurality of information bearing elements, each bearing a third code indicium and containing information classified at a third level of detail.

Further in accordance with an embodiment of the present invention, additional pluralities of information bearing elements each bearing a characteristic code indicium and containing information classified at a given level of detail may be provided.

Additionally in accordance with an embodiment of the present invention, the code indicia may be visually sensible indicia.

Further in accordance with an embodiment of the present invention, the code indicia may comprise a color code.

In accordance with a preferred embodiment of the present invention, the information bearing elements comprise color coded cards. Further in accordance with a preferred embodiment of the present invention, the information contained on the information bearing elements may comprise written information as well as graphic information, such as diagrams or illustrations.

Additionally in accordance with an embodiment of the present invention, the information bearing elements bear a sequential numerical indicia enabling their ready arrangement according thereto in a desired outline format.

Further in accordance with an embodiment of the present invention, the information bearing elements bear at least two sequence indicia enabling their ready arrangement according thereto into one of a plurality of desired outline formats which differ from one another.

Additionally in accordance with an embodiment of the present invention, certain information bearing elements are provided with code subindicia to permit grouping according to subject matter within a given level of detail.

BRIEF DESCRIPTION OF THE TABLES

The present invention will be understood and appreciated more fully from the following detailed description taken in conjunction with the following tables:

Table 1 is an outline key to information bearing elements organized according to standard outline format; and Table 2 is an arrangement of a plurality of information bearing elements containing the information from the outline key of Table 1.

BRIEF DESCRIPTION OF THE DRAWING

The following drawing is of assistance in understanding and appreciating the detailed description of the invention which follows.

DETAILED DESCRIPTION OF THE INVENTION

Figure 1:
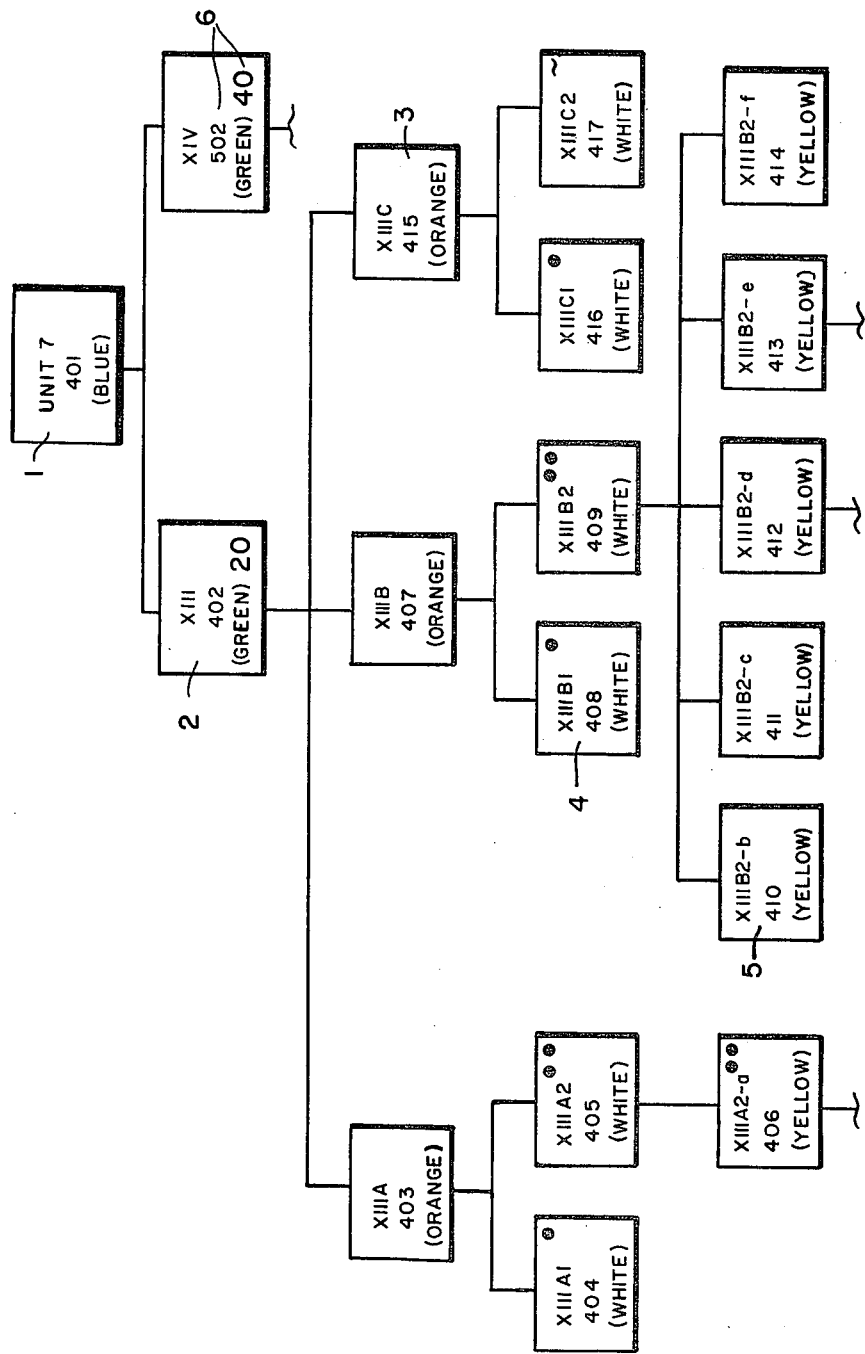
FIG. 1 is a schematic drawing of the claimed learning apparatus showing the relationship between the information bearing elements.

The present invention will now be described by way of example with particular reference to anatomical information which is particularly suited to presentation in the form of a plurality of different levels of detail. It is appreciated that the usefulness of the present invention is not limited to anatomical information but rather the invention may be applied to the presentation and learning of any type of information which lends itself to organization in a plurality of levels of detail.

Table 1, hereinbelow, comprises an outline key which indicates the organization of information relating to part of the human anatomy and refers it to the particular information bearing elements, identified by number, on which the information appears. The outline key is arranged in what will be defined hereinafter as a standard outline format in which each item of information has arranged immediately therebelow all of the information which is classifiable therewithin, and which includes illustrations in graphic form as part of the information. Such outline form is useful for indicating the detailed organization of information relating to a given subject covered by a portion of the outline but does not provide an easily discernable picture of all of the information to a desired selectable level of detail.

Table 2 illustrates a collection of information bearing elements constructed and operative in accordance with a preferred embodiment of the present invention and comprising a plurality of information bearing cards which are color coded according to the level of detail of the information on the card. It can be seen that each card of a different color is provided with more detailed information about a narrower range of subject matter. This permits one to master a large amount of material completely at a desired level of detail while offering the opportunity to delve more deeply into specific areas.

FIG. 1 illustrates the interrelationship of the various color coded information bearing elements. Elements bearing information at the broadest level, 1, here Unit cards color coded blue, appear at the top of FIG. 1. These correspond to the Blue Card presented in Table 2. Elements bearing information at the next level of detail, 2, here Chapter cards color coded green, appear in the next row. These correspond to the Green Card presented in Table 2. The third row contains elements bearing information at the next level of detail, 3, here Subchapter cards color coded orange. These correspond to the Orange Cards presented in Table 2. The fourth row contains elements bearing information at a further level of detail, 4, here cards of the component parts of the subchapters, color coded white. These correspond to the White Cards presented in Table 2. The elements bearing the most detailed information appear in the bottom row, 5, on cards color coded yellow. These correspond to the Yellow Cards presented in Table 2. It is clear that the number of rows of information bearing elements is dependent only upon the number of levels of detail of the subject matter to be mastered. It is a particular feature of the present invention that information at a specific level of detail can be isolated using the code indicia on the information bearing elements. For example, if one wishes only to learn which topics fall within one particular unit without going into all the details of those topics, one can merely study the cards color coded blue, 1, green, 2, and orange, 3, and leave aside the detail cards color coded white, 4, and yellow, 5.

In addition, the information bearing elements at certain levels of detail may be provided with code subindicia to permit grouping according to subject matter within a given level of detail. This is illustrated in FIG. 1 wherein certain white cards are additionally provided with one dot or two dots in the upper right hand corner to permit quick and easy isolation and organization of cards containing related subject matter. It will be appreciated that the code subindicia can be any indicia suitable to permit the user to distinguish between the elements which belong to different groupings.

It is another particular feature of the present invention that the information bearing elements can be arranged according to a number of sequences or outlines depending upon the desired organization of the subject matter. Thus, there may be provided any number of sequencing indicia to indicate the sequence of information bearing elements according to various desired organizational formats. For example, still within the framework of the anatomy of the human body, one such outline may permit organization of the information to be learned according to a systemic approach, i.e. circulatory system, respiratory system, etc., while a second such outline may permit organization of the same information according to a regional approach, i.e. heart, upper limb, etc. Such sequencing indicia are illustrated in FIG. 1 and indicated by reference numeral 6. While numerical sequencing indicia are illustrated, it will be appreciated that any distinguishable sequencing indicia suitable to indicate the proper order may be utilized. Not all the information bearing elements need be utilized in each sequence and additional elements can be added to one sequence as desired.

It will be appreciated that the present invention is not limited to the use of cards as the information bearing elements. Any material suitable for bearing information at a specific level of detail can be utilized, such as microfiche or information organized in a computer. Likewise, any suitable code indicia may be employed, not limited to color coding.

It will further be appreciated that, for those who wish to delve even further into a particular area, reference indicia may be included on the information bearing elements directing the user to an outside source.

TABLE 1

|        |         | card number in FIG. 1 |
|--------|---------|-----------------------|
| UNIT 1 |         |                       |
| I      | Level 1 |                       |
| A      | Level 2 |                       |
| 1      | Level 3 |                       |
| a      | Level 4 |                       |
| i      | Level 5 |                       |
| .      |         |                       |
| .      |         |                       |
| .      |         |                       |
| UNIT 7 | VESSELS AND LYMPHATICS OF THE UPPER LIMB | 401 |
| XIII   | ARTERIES OF THE SHOULDER | 401,402 |
|        | A Thyrocervical Trunk | 402,403 |
|        | 1 Diagram | 403,404 |
|        | 2 Branches | 403,405 |
|        |   a suprascapular a | 405,406 |
|        |     i muscular to supra-spinatus, infra-spinatus, etc. | 406 |
|        |     ii articular to acromio clavicular and shoulder joints | 406 |
|        |     iii acromial to skin over acromion | 406 |
|        |   b superficial (transverse) cervical - deep branch | 405 |
|        | B Axillary Artery | 6402,407 |
|        | 1 Diagram | 407,408 |
|        | 2 Branches | 407,409 |
|        |   a superior thoracic (to serratus ant) | 409 |
|        |   b thoracoacromial | 409,410 |
|        |     i acromial branch | 410 |
|        |     ii deltoid to deltoid and pectorals | 410 |
|        |     iii pectoral branch to pectorals and mammary gland of female | 410 |

TABLE 1-continued

| | | | card number in FIG. 1 |
|---|---|---|---|
| | | iv clavicular branch to subclavius and to sternoclavicular joint | 410 |
| | c | lateral thoracic | 409,411 |
| | | i muscular to pectorals and serratus ant | 411 |
| | | ii to breast of female | 411 |
| | d | subscapular | 409,412 |
| | | i circumflex scap- to muscles of dorsum of scapula | 412 |
| | | ii continues as thoracodorsal a | 412 |
| | e | anterior humeral circumflex | 409,413 |
| | | i muscular to coracobrachialis, short head biceps | 413 |
| | | ii descending branch to pectoralis major | 413 |
| | | iii ascending branch to shoulder joint | 413 |
| | f | posterior humeral circumflex | 409,414 |
| | | i muscular to deltoid | 414 |
| | | ii articular to shoulder joint | 414 |
| | | iii mutrient to greater tuberosity | 414 |
| | | iv descending to lateral long heads of triceps | 414 |
| C | Anastomoses of the Shoulder | | 402,415 |
| | 1 | Diagram | 415,416 |
| | 2 | Anastomosing elements | 415,417 |
| | | a  i suprascapular a with | 417 |
| | | ii deep branch of transverse cervical a | |
| | | b  i suprascapular a with | 417 |
| | | ii circumflex scapular a | |
| | | c  i deep branch of transverse cervical a with | 417 |
| | | ii thoracodorsal a | |
| | | d  i anterior humeral circumflex with | 417 |
| | | ii posterior humeral circumflex | |

TABLE 2

BLUE CARD 401:
UNIT 7 - VESSELS AND LYMPHATICS OF THE UPPER LIMB
  XIII ARTERIES OF THE SHOULDER
  XIV ARTERIES OF THE ARM AND UPPER FOREARM
  XV ARTERIES OF THE FOREARM AND HAND
  XVI VEINS OF THE UPPER LIMB
  XVII LYMPHATICS OF THE UPPER LIMB
GREEN CARD 402:
XIII ARTERIES OF THE SHOULDER
A Thyrocervical Trunk
B Axillary Artery
C Anastomoses of the Shoulder
ORANGE CARD 403:
XIIIA Thyrocervical Trunk
1 Diagram
2 Branches
ORANGE CARD 407:
XIIIB Axillary Artery
1 Diagram
2 Branches
ORANGE CARD 415:
XIIIC Anastomoses of the Shoulder
1 Diagram
2 Anastomosing elements
WHITE CARD 404:
XIIIA1 Branches of the thyrocervical trunk (Diagram)

TABLE 2-continued

WHITE CARD 405:
XIIIA2 Branches of thyrocervical trunk
  a suprascapular artery
  b superficial (transverse) cervical artery - deep branch
WHITE CARD 408:
XIIIB1 Axillary artery and its branches (Diagram)
WHITE CARD 409:
XIIIB2 Branches of axillary artery
  a superior thoracic (to serratus anterior)
  b thoracoacromial
  c lateral thoracic
  d subscapular
  e anterior circumflex humeral
  f posterior circumflex humeral
WHITE CARD 416:
XIIIC1 ANASTOMOSES OF THE SHOULDER (Diagram)
WHITE CARD 417:
XIIIC2 Anastomosing elements of the shoulder
  a  i suprascapular a with
     ii deep branch of transverse cervical a
  b  i suprascapular a with
     ii circumflex scapular a
  c  i deep branch of transverse cervical a
     ii thoracodorsal a
  d  i anterior humeral circumflex a with
     ii posterior humeral circumflex a
YELLOW CARD 406:
XIIIA2-a Branches of suprascapular artery
  i muscular to supraspinatus, infraspinatus and subscapularis
  ii articular to acromioclavicular and shoulder joints
  iii acromial to skin over acromion
YELLLOW CARD 410:
XIIIB2-b Branches of thoracoacromial artery
  i acromial branch
  ii deltoid branch to deltoid and pectoralis muscles
  iii pectoral branch to pectoral muscles and mammary gland of female
  iv clavicular branch to subclavius and to sternoclavicular joint
YELLOW CARD 411:
XIIIB2-c Branches of lateral thoracic artery
  i muscular to pectoralis and serratus anterior
  ii to breast of female
YELLOW CARD 412:
XIIIB2-d Branches of subscapular artery (largest branch)
  i circumflex scapular to muscles of dorsum of scapula (see p 416)
  ii continues as thoracodorsal artery (see p 416)
YELLOW CARD 413:
XIIIB2-e Branches of anterior humeral circumflex artery
  i muscular to coracobrachialis, short head of biceps
  ii descending branch to pectoralis major
  iii ascending branch to shoulder joint
YELLOW CARD 414:
XIIIB2-f Branches of posterior humeral circumflex artery
  i muscular to deltoid
  ii articular to shoulder joint
  iii nutrient to greater tuberosity
  iv descending to lateral, long heads of triceps

I claim:
1. Apparatus for learning information comprising:
a first plurality of selectably arrangeable, information bearing elements, each bearing a first code indicium and containing information classified at a first level of detail, the information contained by each of said first plurality of information bearing ele- ments defining an information element in a first information unit;

a second plurality of selectably arrangeable, information bearing elements, each bearing a second code indicium and containing information classified at a second level of detail, the information contained by each of said second plurality of information bearing elements defining an information element in at least one information chapter, each such chapter containing information corresponding to an information element in said first information unit;

a third plurality of selectably arrangeable, information bearing elements, each bearing a third code indicium and containing information classified at a third level of detail, the information contained by each of said third plurality of information bearing elements defining an information element in at least one information subchapter, each such subchapter containing information corresponding to an information element in said at least one information chapter.

2. Apparatus for learning information according to claim 1 and further comprising additional pluralities of information bearing elements, each bearing a characteristic code indicium and containing information classified at a given level of detail.

3. Apparatus for learning information according to claim 1 wherein the said code indicia are visually sensible indicia.

4. Apparatus for learning information according to claim 1 wherein the said code indicia comprise a color code.

5. Apparatus for learning information according to claim 1 or claim 2 wherein certain elements from at least one such plurality of information bearing elements at a certain level of detail which contain information classifiable according to specific subject matter bear a characteristic code subindicium.

6. Apparatus for learning information according to claim 1 or claim 2 wherein the information bearing elements also bear sequential numerical indicia.

7. Apparatus for learning information according to claim 1 wherein the information contained on the information bearing elements comprises graphic information.

8. Apparatus for learning information according to claim 1 and wherein said each of said second and third pluralities of information bearing elements contains information set indicia indicating to which information element of said information unit, the information contained thereon corresponds.

9. Apparatus for learning information comprising:
a first plurality of information bearing cards each bearing a first color code and containing information classified at a first level of detail, the information contained by each of said first plurality of information bearing cards defining an information element in a first information unit;

a second plurality of information bearing cards, each bearing a second color code and containing information classified at a second level of detail, the information contained by each of said second plurality of information bearing cards defining an information element in at least one information chapter, each such chapter containing information corresponding to an information element in said first information unit; and a third plurality of information bearing cards, each bearing a third color code containing information classified at a third level of detail, the information contained by each of said third plurality of information bearing cards defining an information element in at least one information subchapter, each such subchapter containing information corresponding to an information element in said at least one information chapter.

10. Apparatus for learning information according to claim 9 and further comprising additional pluralities of information bearing cards, each bearing a characteristic color code and containing information classified at a given level of detail.

11. Apparatus for learning information according to claims 1 or 9 wherein said information bearing elements bear:
first sequential indicia indicating the location of that element in accordance with a first predetermined sequence; and
second sequential indicia indicating the location of that element in accordance with a second predetermined sequence, which is different from said first predetermined sequence.

* * * * *